United States Patent
Lim et al.

(10) Patent No.: US 10,855,341 B2
(45) Date of Patent: Dec. 1, 2020

(54) METHOD OF DETERMINING DIRECTION OF ANTENNA FOR TRANSMITTING SIGNAL BY TERMINAL

(71) Applicant: LG ELECTRONICS INC., Seoul (KR)

(72) Inventors: Suhwan Lim, Seoul (KR); Youngryoul Kim, Seoul (KR); Manyoung Jung, Seoul (KR); Joohee Lee, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 16/247,438

(22) Filed: Jan. 14, 2019

(65) Prior Publication Data
US 2019/0222267 A1   Jul. 18, 2019

Related U.S. Application Data

(60) Provisional application No. 62/617,308, filed on Jan. 15, 2018.

(51) Int. Cl.
| | | |
|---|---|---|
| *H04B 7/0404* | (2017.01) | |
| *H04B 7/06* | (2006.01) | |
| *H04L 5/14* | (2006.01) | |
| *H04B 7/08* | (2006.01) | |

(52) U.S. Cl.
CPC ......... *H04B 7/0404* (2013.01); *H04B 7/0617* (2013.01); *H04B 7/0695* (2013.01); *H04B 7/088* (2013.01); *H04L 5/14* (2013.01)

(58) Field of Classification Search
CPC .. H04B 7/0404; H04B 7/0617; H04B 7/0695; H04B 7/088; H04L 5/14
See application file for complete search history.

(56) References Cited

U.S. PATENT DOCUMENTS

| | | | | |
|---|---|---|---|---|
| 2001/0028329 A1* | 10/2001 | Falk | ..................... | H01Q 21/245 343/770 |
| 2004/0203910 A1* | 10/2004 | Hind | ..................... | H04W 48/04 455/456.1 |
| 2007/0147554 A1* | 6/2007 | Yoshida | ................ | H04W 52/52 375/345 |
| 2013/0252629 A1* | 9/2013 | Wigren | ................. | H04W 64/00 455/456.1 |
| 2016/0233936 A1* | 8/2016 | Shim | .................... | H04B 7/0473 |

* cited by examiner

*Primary Examiner* — Un C Cho
*Assistant Examiner* — Peter K Mak
(74) *Attorney, Agent, or Firm* — Lee Hong Degerman Kang Waimey

(57) ABSTRACT

The present invention discloses a method of transmitting signal by a terminal. The method comprises determining a direction of at least one antenna based on power loss tolerance of the signal and angle tolerance of the at least one antenna; and transmitting the signal based on the direction of the at least one antenna, wherein the power loss tolerance of the signal is determined at maximum of 2 dB.

10 Claims, 15 Drawing Sheets

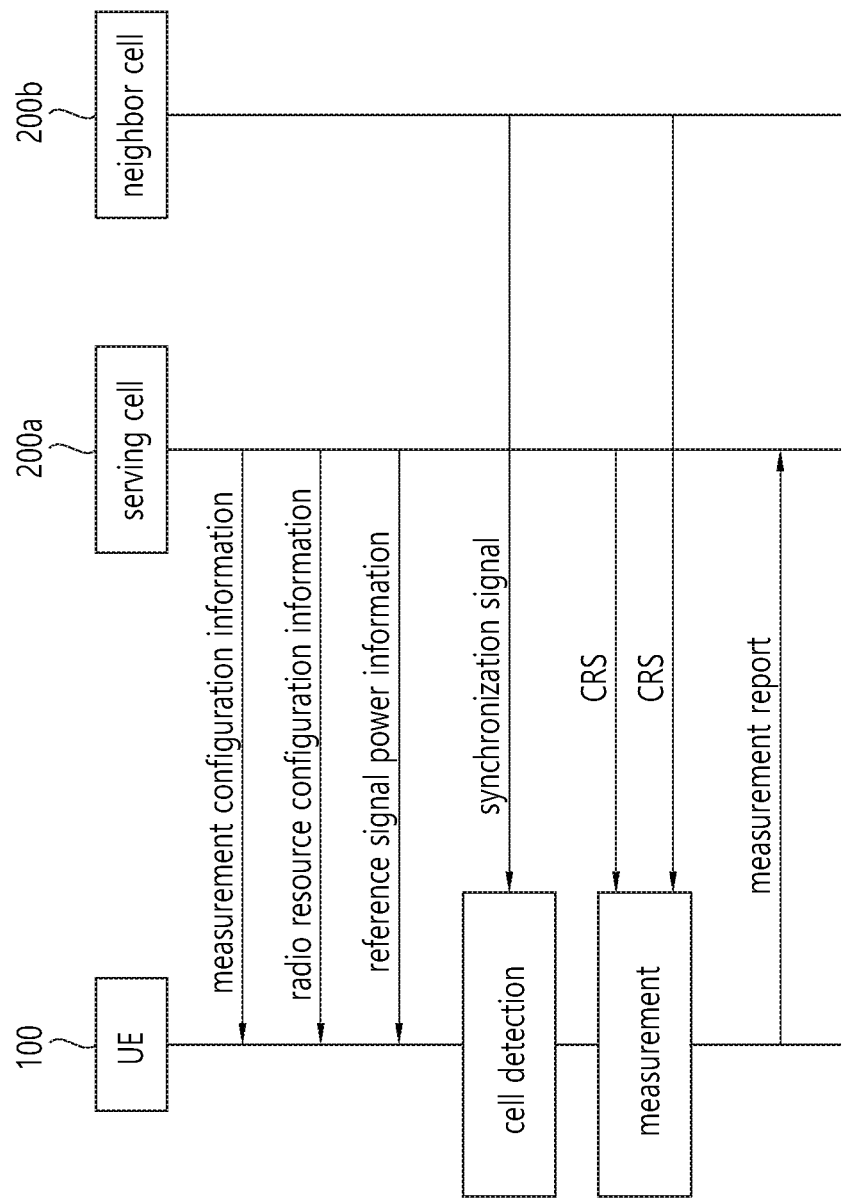

METHOD OF DETERMINING DIRECTION OF ANTENNA FOR TRANSMITTING SIGNAL BY TERMINAL

CROSS-REFERENCE TO RELATED APPLICATIONS

Pursuant to 35 U.S.C. § 119(e), this application claims the benefit of U.S. Provisional Patent Application No. 62/617,308, filed on Jan. 15, 2018, the contents of which are hereby incorporated by reference herein in its entirety.

BACKGROUND OF THE INVENTION

Field of the Invention

The present invention relates to mobile communication.

Discussion of the Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly In 5G NR, a physical broadcast channel (PBCH) and a synchronization signal (including a PSS and an SSS) including information required for the UE to perform an initial access, that is, an MIB are defined as an SS block. In addition, a plurality of SS blocks may be defined as an SS burst and a plurality of SS bursts may be collected and defined as an SS burst set. Each SS block is assumed to be beamformed in a specific direction and several SS blocks in the SS burst set are designed to support terminals in different directions.

Meanwhile, in mmWave, basically, it can be divided into the case where the reciprocity of the beam is satisfied and the case where it is not.

Generally, at the mmWave frequency using TDD, if the Tx beam and the Rx beam use the same patch and same the same number of antennas, the direction of the Tx beam is determined based on the characteristic of the Rx beam. This is because it is assumed that there is a correspondence between the Tx beam and the Rx beam.

However, if the number of antenna is different or type of antenna is different, the above assumption is not made. Therefore, in this case, the tolerance of the beam direction according to the number of antennas should be considered.

SUMMARY OF THE INVENTION

Therefore, one disclosure of the present specification is aimed at suggesting a solution to the aforementioned problem.

To achieve the aforementioned purposes of the present invention, one disclosure of the present specification provides a method of transmitting signal by a terminal. The method comprises determining a direction of at least one antenna based on power loss tolerance of the signal and angle tolerance of the at least one antenna; and transmitting the signal based on the direction of the at least one antenna, wherein the power loss tolerance of the signal is determined at maximum of 2 dB.

The angle tolerance of the at least one antenna is determined at maximum of ±18 degrees in the horizontal direction and at maximum of ±18 degrees in the vertical direction.

The angle tolerance of the at least one antenna is determined based on the power loss tolerance of the signal.

The angle tolerance of the at least one antenna is further determined based on number of antennas.

The at least one antenna includes two horizontal antennas and two vertical antennas.

To achieve the aforementioned purposes of the present invention, another disclosure of the present specification provides a terminal for transmitting signal. The terminal comprises a transceiver configured to transmit the signal; and a processor configured to control the transceiver, wherein the processor is further configured to: determine a direction of at least one antenna based on power loss tolerance of the signal and angle tolerance of the at least one antenna, and control the transceiver to transmit the signal based on the direction of the at least one antenna, wherein the power loss tolerance of the signal is determined at maximum of 2 dB.

According to a disclosure of the present invention, the above problem of the related art is solved.

BRIEF DESCRIPTION OF THE DRAWINGS

FIG. 3 illustrates a cell detection and measurement procedure.

DETAILED DESCRIPTION OF THE EMBODIMENTS

Figure 1:
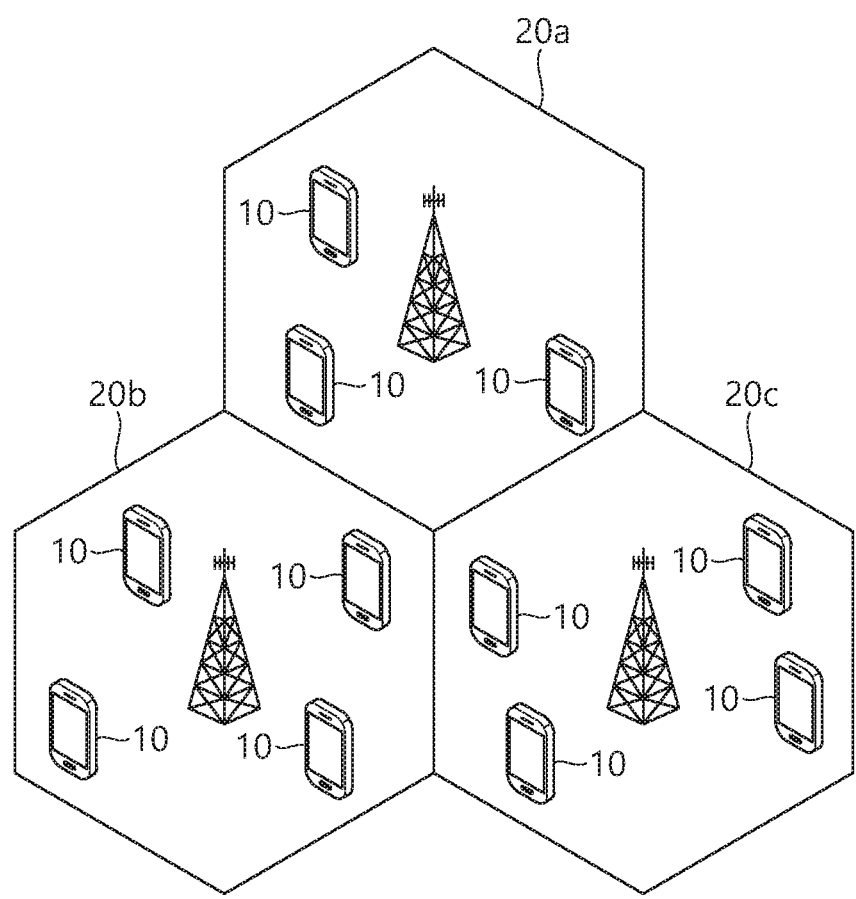
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be extended to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
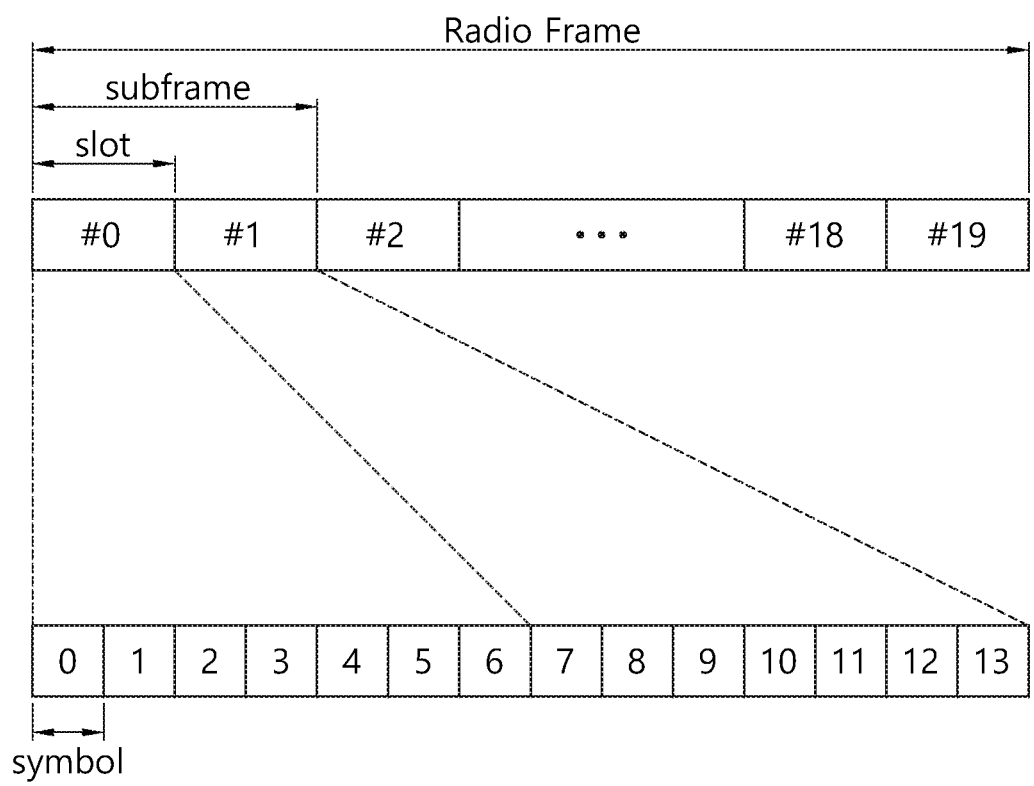
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

In the mobile communication system, mobility support of the UE 100 is required. Accordingly, the UE 100 continuously measures a quality of a serving cell providing a current service and the quality of a neighboring cell. The UE 100 reports a measurement result to the network at an appropriate time and the network provides optimum mobility to the UE through handover or the like. Often, measurement of such a purpose is referred to as radio resource management (RRM).

Meanwhile, the UE 100 monitors a downlink quality of a primary cell (Pcell) based on a CRS. This is referred to as radio link monitoring (RLM).

FIG. 3 Illustrates a Cell Detection and Measurement Procedure.

As can be seen with reference to from FIG. 3, the UE detects the neighboring cell based on a synchronization signal (SS) transmitted from the neighboring cell. The SS may include a primary synchronization signal (PSS) and a secondary synchronization signal (SSS).

In addition, when each of the serving cell 200a and the neighboring cell 200b transmits a cell-specific reference signal (CRS) to the UE 100, the UE 100 performs measure through the CRS and transmits a measurement result thereof to the serving cell 200a. In this case, the UE 100 compares power of the received CRS based on information on received reference signal power.

In this case, the UE 100 may perform the measurement by three following methods.

1) Reference signal received power (RSRP): represents average received power of all REs that carry the CRS transmitted over the entire band. In this case, the average received power of all REs that carry a channel state information (CSI)-reference signal (RS) instead of the CRS.

2) Received signal strength indicator (RSSI): represents received power measured in the entire band. The RSSI includes all of the signal, interference, and thermal noise.

3) Reference symbol received quality (RSRQ): represents the CQI and may be determined as the RSRP/RSSI depending on a measurement bandwidth or subband. That is, the RSRQ refers to a signal-to-noise interference ratio (SINR). The RSRP does not provide sufficient mobility information, the RSRQ may be used instead of the RSRP in the process of handover or cell reselection.

The RSRQ may be calculated as RSSI/RSSP.

Meanwhile, as illustrated in FIG. 3, the UE 100 receives a radio resource configuration information element (IE) from the serving cell 100a for the measurement. The radio resource configuration dedicated information element (IE) is used for configuring/modifying/canceling a radio bearer, modifying a MAC configuration, and the like. The radio resource configuration IE includes subframe pattern information. The subframe pattern information is information on a measurement resource restriction pattern on the time domain for measuring RSRP and RSRQ for a serving cell (for example, a primary cell).

Meanwhile, the UE 100 receives a measurement configuration (hereinafter also referred to as "measconfig") information element (IE) from the serving cell 100a for the measurement. A message including the measurement configuration information element (IE) is referred to as a measurement configuration message. Here, the measurement configuration information element (IE) may be received through an RRC connection reconfiguration message. When a measurement result satisfies a reporting condition in the measurement configuration information, the UE reports the measurement result to the base station. A message including the measurement result is referred to as a measurement report message.

The measurement configuration IE may include measurement object information. The measurement object information is information about an object to be measured by the UE. The measurement object includes at least any one of an intra-frequency measurement object which is an intra-cell measurement object, an inter-frequency measurement object which is an inter-cell measurement object, and an inter-RAT measurement object which is an inter-RAT measurement object. For example, the intra-frequency measurement object may indicate a neighbor cell having the same frequency band as a serving cell, the inter-frequency measurement object may indicate a neighbor cell having a different frequency band from the serving cell, and the inter-RAT measurement object may indicate a neighbor cell of am RAT different from the RAT of the serving cell.

TABLE 1

| Description of measurement object field |
| --- |
| carrierFreq |
| This indicates the E-UTRA carrier frequency to which this configuration applies. |
| measCycleSCell |
| This indicates a cycle for measuring SCell in a deactivated state. The value |
| may be set to 160, 256, and the like. When the value is 160, measurement is performed every 160 subframes. |

Meanwhile, the measurement configuration IE includes an IE (information element) as shown in table below.

TABLE 2

| Description of MeasConfig field |
| --- |
| allowInterruptions |
| When the value is True, this indicates that when the UE performs measurements using |
| MeasCycleScell for carriers of the deactivated Scell, it is allowed to stop sending and receiving with the serving cell. |
| measGapConfig |
| Configure or release a measurement gap. |

The measGapConfig is used to configure or release a measurement gap (MG). The measurement gap MG is a period for performing cell identification and RSRP measurement on an inter frequency different from the serving cell.

TABLE 3

| Description of MeasConfig field |
| --- |
| gapOffset |
| The value of gapOffset may be set to either gp0 or gp1. gp0 corresponds to a gap offset of a pattern ID "0" having MGRP = 40 ms. Gp1 corresponds to a gap offset of a pattern ID "1" having MGRP = 40 ms. |

TABLE 4

| Gap pattern Id | Measurement Gap Length (MGL) | Measurement Gap Repetition Period (MGRP) | Minimum time to perform measurement for inter-frequency and inter-RAT during period of 480 ms |
|---|---|---|---|
| 0 | 6 ms | 40 ms | 60 ms |
| 1 | 6 ms | 80 ms | 30 ms |

If the UE requires a measurement gap to identify and measure inter-frequency and inter-RAT cells, the E-UTRAN (i.e., the base station) may determine a measurement gap (MG) having a constant gap period. The UE does not transmit or receive any data from the serving cell during the measurement gap period, retunes its RF chain to the inter-frequency, and then performs the measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Meanwhile, hereinafter, IoT will be described.

IoT refers to information exchange through the base station between IoT devices without accompanying human interaction and information exchange through the base station between an IoT device and a server. As such, IoT communication communicates via cellular base stations and thus is also referred to as cellular Internet of Things (CIoT).

Such IoT communication is a type of machine type communication (MTC). Therefore, the IoT device may be referred to as an MTC device.

Since the IoT communication has features that a transmission data amount is small and uplink or downlink data transmission and reception rarely occur, it is preferable to lower the cost of the IoT device and reduce battery consumption in accordance with a low data transmission rate. In addition, since the IoT device has a feature of low mobility, the channel environment is not almost changed.

As one method for low-cost IoT devices, regardless of a system bandwidth of the cell, the IoT device may use a sub-band of, for example, approximately 1.4 MHz.

IoT communication operating on such a reduced bandwidth may be called narrow band (NB) IoT communication or NB CIoT communication.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile BroadBand (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 4A:
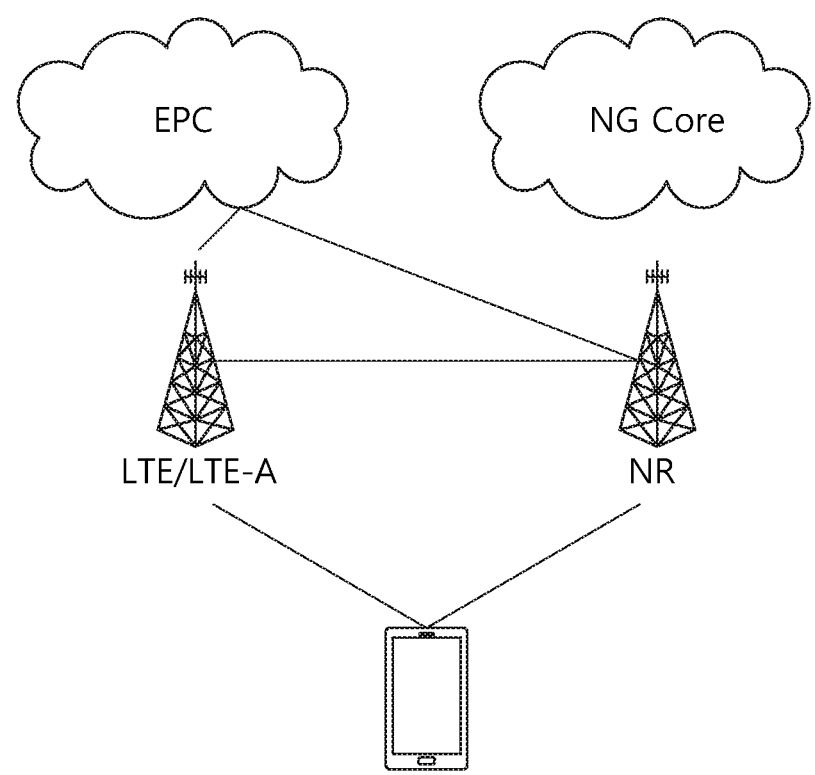
FIGS. 4A to 4C are exemplary diagrams illustrating an exemplary architecture for a service for next-generation mobile communication.
Figure 4B:
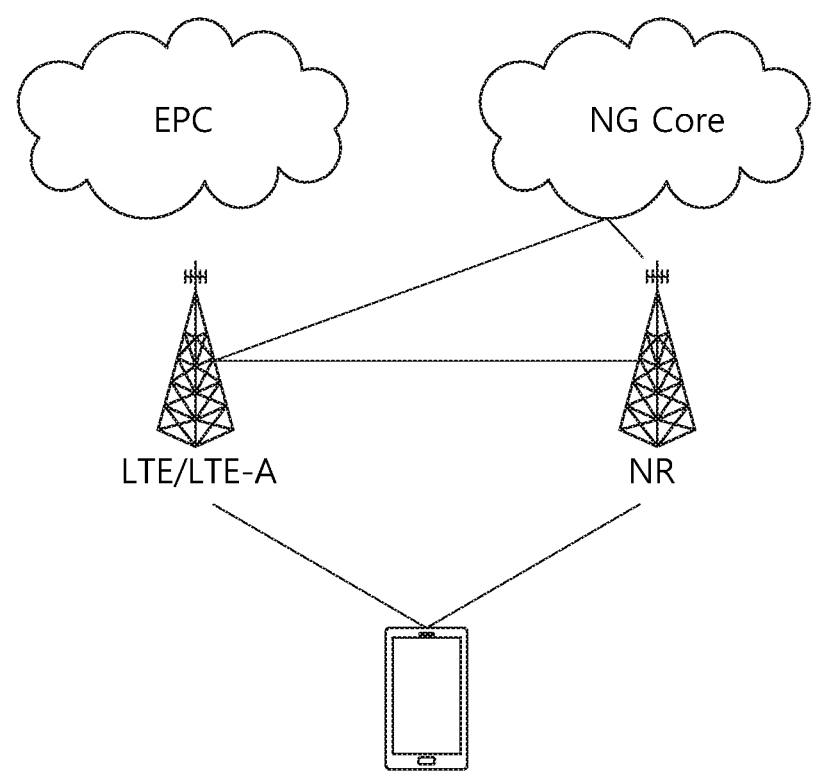
Figure 4C:
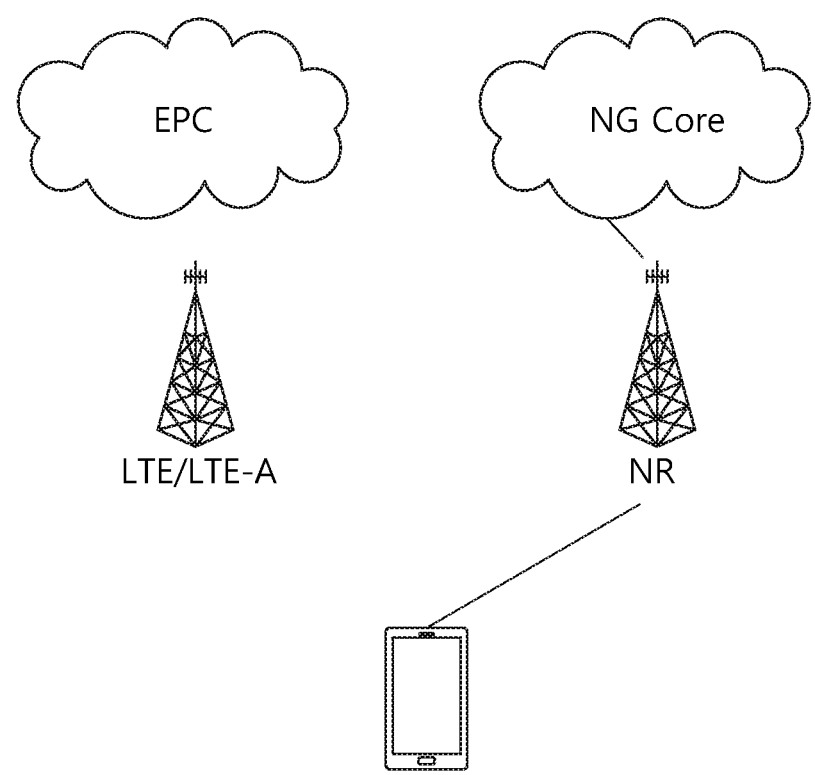

FIGS. 4a to 4c are Exemplary Diagrams Illustrating Exemplary Architectures for Services of the Next Generation Mobile Communication.

Referring to FIG. 4a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 4b, unlike FIG. 4a, the LTE/LTE-A based cell is connected to a core network for the 5G mobile communication, that is, a next generation (NG) core network.

The service scheme based on the architecture as illustrated in FIGS. 4A and 4B is called non-standalone (NSA).

Referring to FIG. 4c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 5:
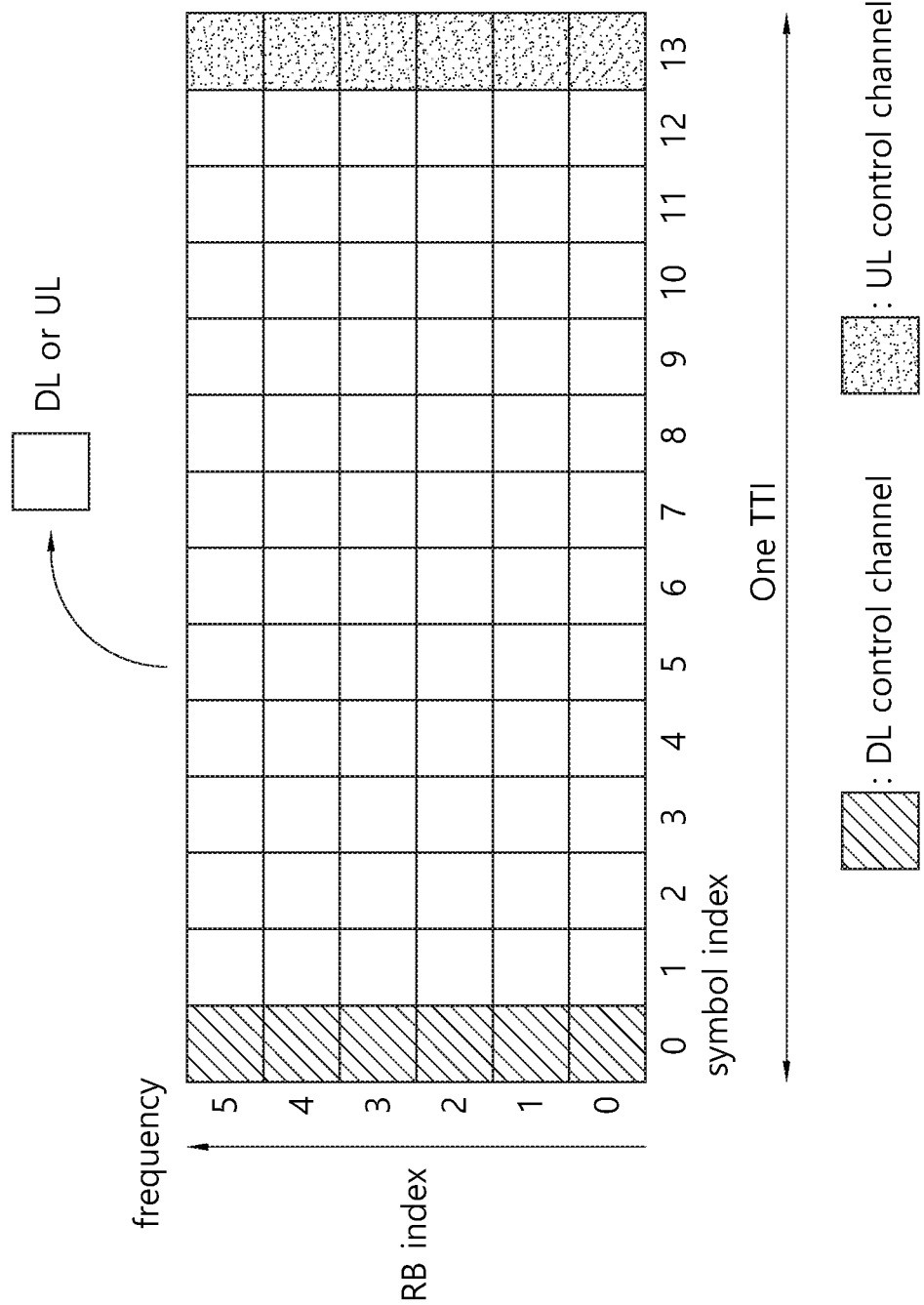
FIG. 5 illustrates an example of a subframe type in NR.

FIG. 5 Illustrates an Example of a Subframe Type in NR.

A transmission time interval (TTI) shown in FIG. 5 may be referred to as a subframe or slot for NR (or new RAT). The subframe (or slot) of FIG. 5 may be used in a TDD system of NR (or new RAT) to minimize the data transmission delay. As illustrated in FIG. 4, a subframe (or slot) includes 14 symbols, like the current subframe. The front symbol of the subframe (or slot) may be used for a DL control channel, and the rear symbol of the subframe (or slot) may be used for a UL control channel. The remaining symbols may be used for DL data transmission or UL data transmission. According to such a subframe (or slot) structure, downlink transmission and uplink transmission may be sequentially performed in one subframe (or slot). Accordingly, downlink data may be received within a subframe (or slot), and an uplink acknowledgment response (ACK/NACK) may be transmitted within the subframe (or slot). The structure of such a subframe (or slot) may be referred to as a self-contained subframe (or slot). The use of such a sub-frame (or slot) structure has an advantage that the time taken to retransmit the data where a receive error occurs is reduced and a latency time of the last data transmission may be minimized. In such a self-contained subframe (or slot) structure, a time gap may be required in a transition process from the transmission mode to the reception mode or from the reception mode to the transmission mode. To this end, some OFDM symbols at the time of switching from DL to UL in the subframe structure may be configured as a guard period (GP).

<Support of Various Numerologies>

In the next system, a number of numerologies may be provided to the UE with the development of a wireless communication technology.

The numerology may be defined by a cycle prefix (CP) length and a subcarrier spacing. One cell may provide a plurality of numerologies to the UE. When the index of the numerology is denoted by each subcarrier interval and corresponding CP length may be as shown in table below.

TABLE 5

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, extended |
| 3 | 120 | Normal |
| 4 | 240 | Normal |

In the case of a normal CP, when the index of the numerology is denoted by $\mu$, the number Nslotsymb of OFDM symbols per slot, the number Nframe,$\mu$slot of slots per frame, and the number Nsubframe,$\mu$slot of slots per subframe are shown in Table below.

TABLE 6

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when the index of the numerology is denoted by the number Nslotsymb of OFDM symbols per slot, the number Nframe,$\mu$slot of slots per frame, and the number Nsubframe,$\mu$slot of slots per subframe are shown in Table below.

TABLE 7

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol in a symbol may be used as a downlink or as an uplink as shown in table below. In the following table, the uplink is denoted by U and the downlink is denoted by D. In Table below, X represents a symbol that may be used flexibly in the uplink or downlink.

TABLE 8

| | Symbol number in slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |

TABLE 8-continued

| Format | \multicolumn{14}{c}{Symbol number in slot} |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | X | X | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | U | X | U | U | U | U | U | U |
| 51 | X | X | U | U | U | U | U | X | U | U | U | U | U | U |
| 52 | X | X | X | U | U | U | U | X | X | U | U | U | U | U |
| 53 | X | X | X | X | U | U | U | X | X | X | U | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | U | U |
| 61 | D | X | X | X | X | U | D | D | X | X | X | X | U | U |

<Operating Band in NR>

The operating band in NR is as follows.

The operating band in Table 9 below is an operating band that has been reformed from the LTE/LTE-A operating band.

TABLE 9

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table shows an NR operating band defined on a high frequency.

TABLE 10

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

On the other hand, when the operating band of the above table is used, the channel bandwidth is used as shown in Table below.

TABLE 11

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS means subcarrier spacing. In the above table, NRB represents the number of RBs.

On the other hand, when the operating band of the above table is used, the channel bandwidth is used as shown in Table below.

TABLE 12

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 6:
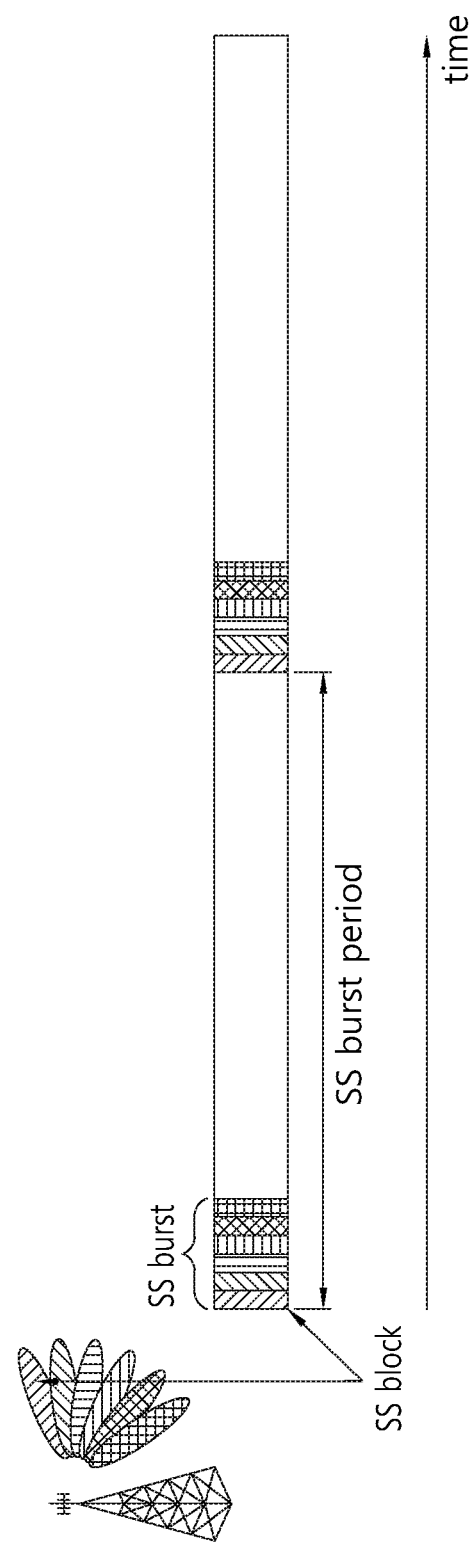
FIG. 6 is an exemplary diagram illustrating an example of an SS block in the NR.

FIG. 6 is an Exemplary Diagram Illustrating an Example of an SS Block in NR.

Referring to FIG. 6, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 7.

Figure 7:
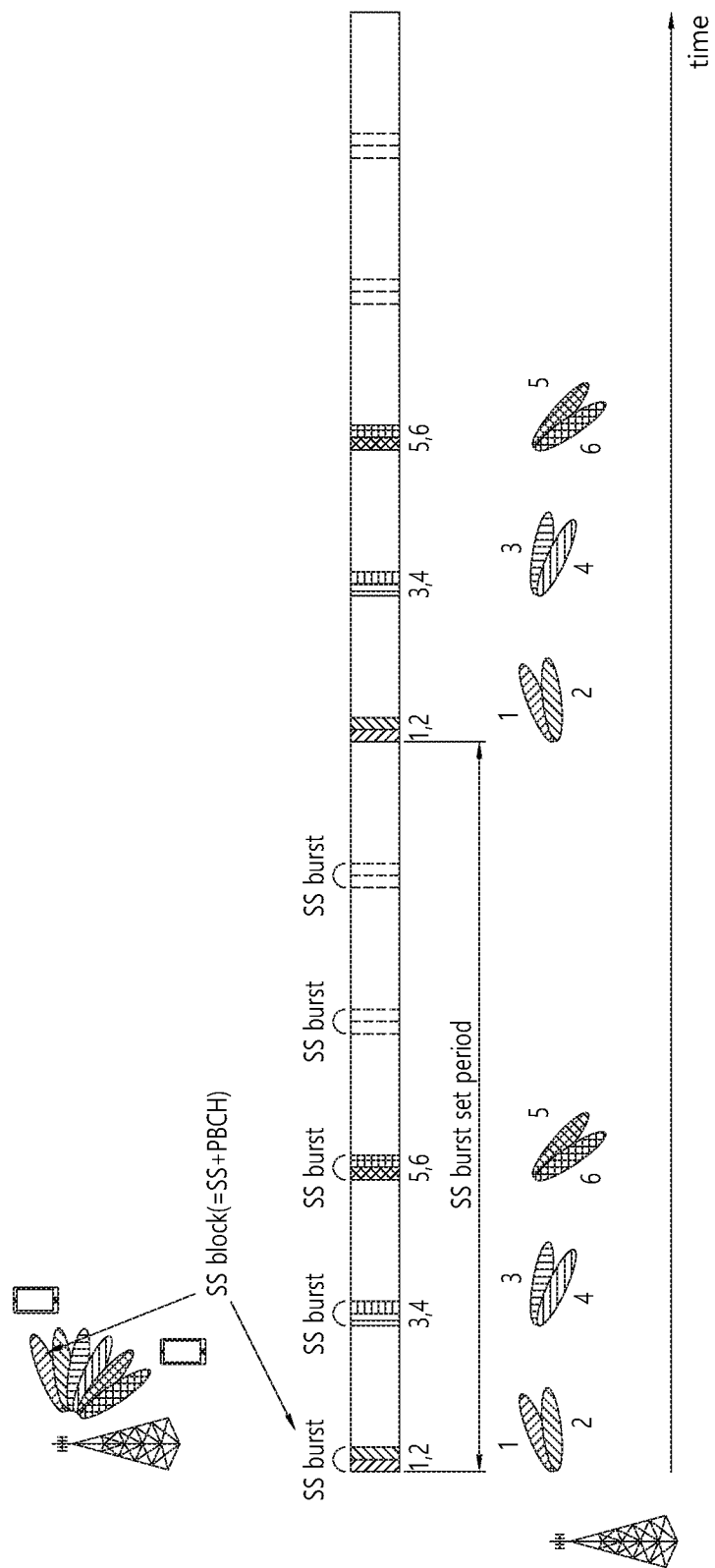
FIG. 7 is an exemplary diagram illustrating an example of beam sweeping in the NR.

FIG. 7 is an Exemplary Diagram Illustrating an Example of Beam Sweeping in NR.

The base station transmits each SS block in the SS burst with beam sweeping over time. At this time, the SS blocks in the SS burst set are transmitted in order to support UEs existing in different directions. In FIG. 6, the SS burst set includes SS blocks 1 to 6, and each SS burst includes two SS blocks.

<Channel Raster and Sync Raster>

Hereinafter, a channel raster and a sync raster will be described.

A frequency channel raster is defined as a set of RF reference frequencies (FREF). The RF reference frequency may be used as a signal for indicating the position of an RF channel, an SS block, and the like.

The global frequency raster is defined for all frequencies of 0 to 100 GHz. The unit of the global frequency raster is denoted by AFGlobal.

The RF reference frequency is specified by an NR absolute radio frequency channel number (NR-ARFCN) in the range of the global frequency raster (0 . . . 2016666). The relationship between the NR-ARFCN and the RF reference frequency FREF of MHz may be expressed by the following Equation. Here, FREF-Offs and NRef-Offs are shown in the following Table.

$$F\text{REF} = F\text{REF-Offs} + \Delta F\text{Global}(N\text{REF} - N\text{REF-Offs})$$ [Equation 1]

TABLE 13

| Frequency range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The channel raster represents a subset of RF reference frequencies that may be used to identify RF channel locations in the uplink and downlink. The RF reference frequency for the RF channel may be mapped to a resource element on the carrier.

The mapping between the RF reference frequency of the channel raster and the corresponding resource element may be used to identify an RF channel location. The mapping depends on the total number of RBs allocated to the channel and is applies to both UL and DL.

In the case of NRB mod 2=0,
an RE index k is 0, and
the PRB number is as follows.

$$n_{PRB} = \left\lfloor \frac{N_{RB}}{2} \right\rfloor$$

In the case of NRB mod 2=1,
an RE index k is 6, and
the PRB number is as follows.

$$n_{PRB} = \left\lfloor \frac{N_{RB}}{2} \right\rfloor$$

The RF channel location of the channel raster on each NR operating band may be represented as shown in the following Table.

TABLE 14

| NR operating band | $\Delta F_{Raster}$ (kHz) | Uplink frequency range of $N_{REF}$ (First-<Step size>-Last) | Downlink frequency range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |

TABLE 14-continued

| NR operating band | $\Delta F_{Raster}$ (kHz) | Uplink frequency range of $N_{REF}$ (First-<Step size>-Last) | Downlink frequency range of $N_{REF}$ (First-<Step size>-Last) |
|---|---|---|---|
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 15

| NR operating band | $\Delta F_{Raster}$ (kHz) | Uplink and downlink frequency range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

On the other hand, the sync raster represents the frequency location of the SS block used to obtain system information by the UE. The frequency location of the SS block may be defined as SSREF using the corresponding GSCN number.

The present invention relates to a test method for UE RF related requirements to identify whether reciprocity of the Tx beam and Rx beam of NR UE are established.

In mmWave, basically, it can be divided into the case where the reciprocity of the beam is satisfied and the case where it is not.

Generally, at the mmWave frequency using TDD, if the Tx beam and the Rx beam use the same patch and same the same number of antennas, the direction of the Tx beam is determined based on the characteristic of the Rx beam. This is because it is assumed that there is a correspondence between the Tx beam and the Rx beam.

However, if the number of antenna is different or type of antenna is different, the above assumption is not made. Therefore, in this case, the tolerance of the beam direction according to the number of antennas should be considered.

Therefore, the present invention proposes a method for determining whether the terminal supports beam correspondence by simply testing the correspondence between the Tx beam and Rx beam.

DISCLOSURE OF THE PRESENT INVENTION

In RAN4 meeting, the beam correspondence test methodology has been discussed and just agreed as below.
Agreement: The requirements for beam correspondence should consider the transmit and receive direction of signals.

In the present invention, we show our view how to define the test methodology for beam correspondence requirements at mmWave.

I. Test Method for Beam Correspondence

RAN1 and RAN4 discussed the description of beam correspondence and reciprocity between Tx beam direction and Rx beam directions. However, RAN4 just started discussion for beam correspondence RF requirements. If beam reciprocity are guaranteed by this RF requirements, then RAN4 can replace the test of Effective Isotropic Sensitivity (EIS) receiver requirements for spherical coverage by the Effective Isotropic Radiated Power (EIRP) requirements for spherical coverage.

Because the UE guarantees the Tx beam pattern is almost similar or same with Rx beam pattern as beam correspondence requirements. Actually, the beam correspondence could not be guaranteed when different antenna type and antenna patch are used for each transmission or reception. So it is not meaningful to consider all spherical beam direction.

Therefore, RAN4 can define test methodology for this test requirements as below proposal.
Proposal 1: The requirements for beam correspondence should consider the difference between peak EIRP direction and peak EIS direction in some directions.

II. Proposed Test Methodology

Figure 8:
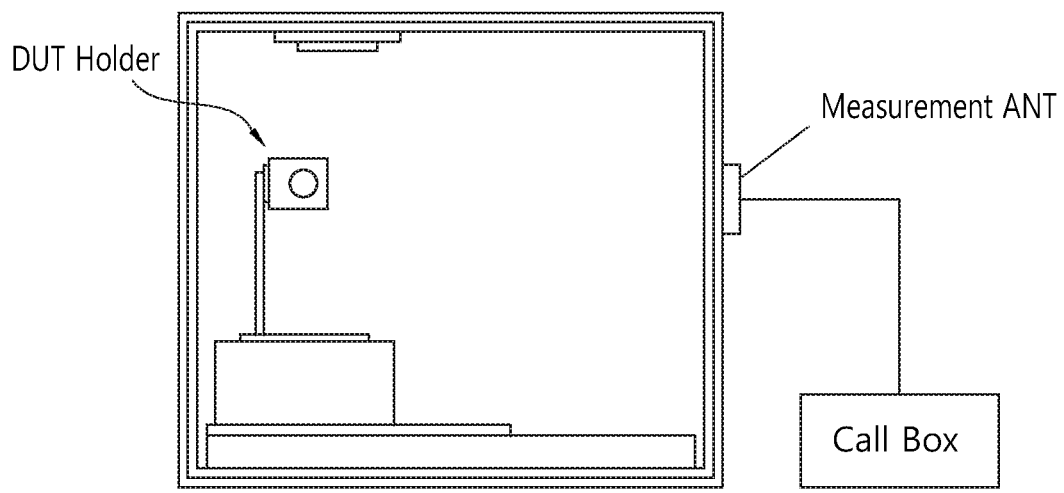
FIG. 8 illustrates the OTA 3D chamber configuration for beam correspondence requirements.

FIG. 8 Illustrates the OTA 3D Chamber Configuration for Beam Correspondence Requirements.

The requirement defined based on Proposal 1 and test tolerance could be tested with the following procedure.

1. The UE finds best EIS beam direction such as detail azimuth and elevation position (θ, ψ).
2. Test tolerance is calculated based on UE antenna pattern in Table 16 equation as below.

For example, if tolerance is defined 2 dB loss bandwidth of antenna pattern with 1×1 antenna configuration, then the allowed peak EIRP range is defined as (θ±36°, φ±36°).

3. The UE is configured to UL signals and TE measures the UL EIRP test on allowed test tolerance range at multiple measured Antenna including best beam direction.
4. Decide pass or fail based on found best EIRP beam direction and EIS beam direction.

Herein, tolerance means maximum value to be allowed. That is, the power loss tolerance means maximum power loss to transmit signal correctly, and the angle tolerance means maximum angle with base station to transmit correctly.

The tolerance will be calculated as based on Table 16.

TABLE 16

| Parameter | Values |
|---|---|
| Antenna element vertical radiation pattern (dB) | $A_{E,V}(\theta'') = -\min\left\{12\left(\frac{\theta'' - 90°}{\theta_{3dB}}\right)^2, SLA_V\right\} \theta_{3dB} = 90°, SLA_V = 25$ dB |

TABLE 16-continued

| Parameter | Values |
|---|---|
| Antenna element horizontal radiation pattern (dB) | $A_{E,H}(\varphi'') = -\min\left\{12\left(\frac{\varphi''}{\varphi_{3dB}}\right)^2, A_m\right\}\varphi_{3dB} = 90°, A_m = 25 \text{ dB}$ |
| Combining method for 3D antenna element pattern (dB) | $A''(\theta'', \varphi'') = -\min\{-[A_{E,V}(\theta'') + A_{E,H}(\varphi'')], A_m\}$ |

Figure 9A:
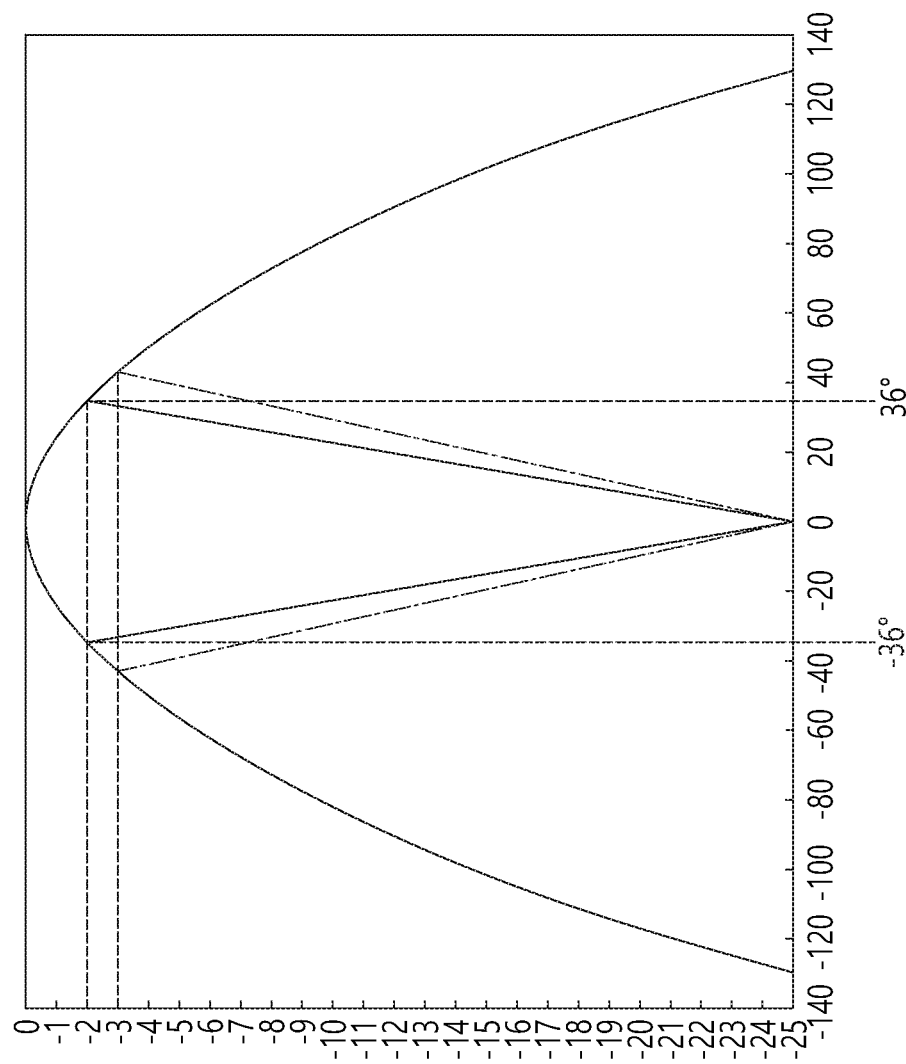
FIG. 9a and FIG. 9b illustrates UE antenna pattern and allowed test ranges.
Figure 9B:
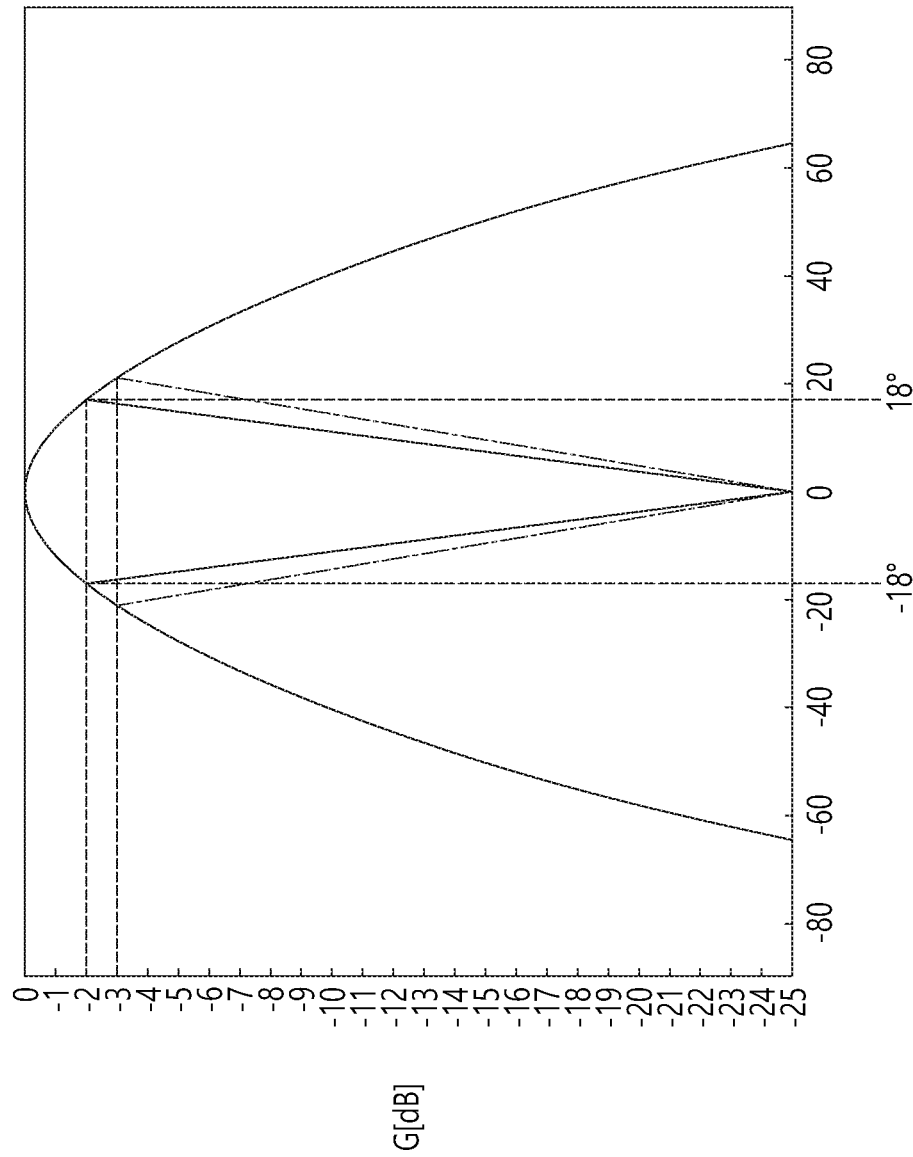

FIG. 9a and FIG. 9b Illustrates UE Antenna Pattern and Allowed Test Ranges.

Referring to FIG. 9a and FIG. 9b, if UE has 1×1 antenna type at mmWave, then 2 dB loss tolerance means $$A_{E,H_{2dB}}(\varphi) = -\min\left\{12\left(\frac{\varphi°}{\varphi_{3dB}}\right)^2, A_m\right\} = -2 \text{ dB},.$$

The loss tolerance (that is, power loss tolerance) may be at most 3 dB to maintain the quality of beam direction. Especially, the allowed loss tolerance (that is, power loss tolerance) in our analysis may be at most 2 dB to keep the throughput performance at mmWave.

In here, $$12\left(\frac{\varphi°}{90°}\right)^2 = 2 \text{ dB},$$

so we can derive φ°=±36° as shown for 1×1 Tx antenna configuration in FIG. 9a. And 2×2 Tx configuration, the angle tolerance is φ±18° in FIG. 9b.

That is, referring to FIG. 9a, when the UE has 1×1 antenna and the power loss tolerance is 2 dB, the angle tolerance may be ±36 degrees. And referring to FIG. 9b, when the UE has 2×2 antenna and the power loss tolerance is 2 dB, the angle tolerance may be ±18 degrees to design the antenna configuration for test equipment in chamber for mmWave frequency.

The angle tolerance may be determined based on the power loss tolerance and the number of antennas.

Figure 10:
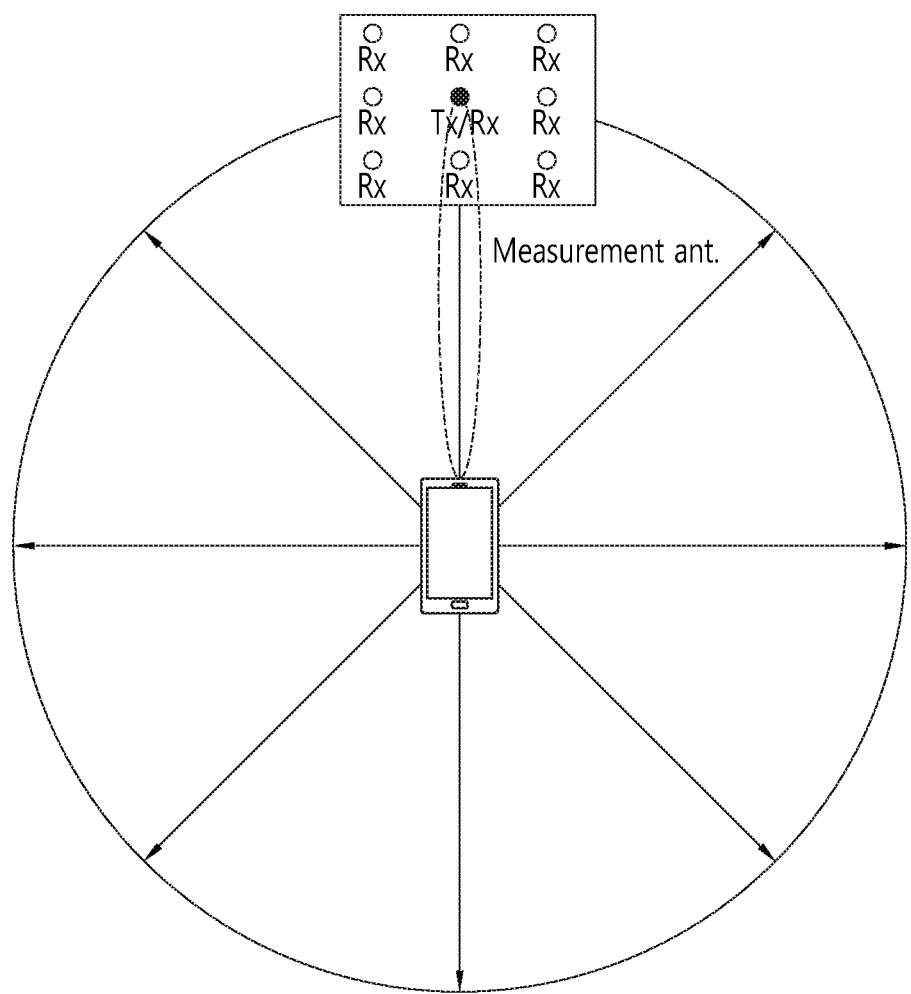
FIG. 10 illustrates Basic beam correspondence test with multiple measurement antennas.

FIG. 10 Illustrates Basic Beam Correspondence Test with Multiple Measurement Antennas.

As shown in FIG. 10, the maximum T-put will be measured in 9 Rx antennas. The antenna spacing will be decided based on allowed angle tolerance. Therefore, only compare the maximum EIRP levels in among measurement antennas. Then we can find the best EIRP beam direction.

If the Tx/Rx beam is same, the beam correspondence for UE are established, but the maximum T-put is observed in other direction, then the UE's beam correspondence test was failed.

For different NR UE antenna configuration, the half power bandwidth and allowed test tolerance will be changed as shown in Table 17.

TABLE 17

| | ANT number (N, M) | | | |
|---|---|---|---|---|
| | 1 | 2 | 3 | 4 |
| Vertical Half Power BW (90/N) | 90 | 45 | 22.5 | 11.3 |
| Horizontal Half Power BW (90/M) | 90 | 45 | 22.5 | 11.3 |

TABLE 17-continued

| | ANT number (N, M) | | | |
|---|---|---|---|---|
| | 1 | 2 | 3 | 4 |
| Allowed angle from best beam direction (Vertical) | ±36° | ±18° | ±9° | ±4° |
| Allowed angle from best beam direction (Horizontal) | ±36° | ±18° | ±9° | ±4° |

Note
1: Criterion should be decide the max number of Ant. between vertical and horizontal of each element. It means that the reference is Max (Ant. N, Ant. M)
Note
2: Black box approach will be used, so basic reference Ant. Configuration for beam correspondence is 2 × 2 Ant. configuration. If RAN4 agree white box approach, then UE vendor can provide the antenna configuration information.

Based on this test methodology, we propose as below.

Proposal 2. The proposed test methodologies in section II are used for UE beam correspondence requirements. The allowed angle tolerance will be decide based on RAN4 consensus by measurement results Proposal 3. Define the beam correspondence requirement according to antenna configuration. However, 2×2 antenna configuration is baseline to specify the beam correspondence requirements.

III. Conclusion

In the present invention, we explained the test methodology of the beam correspondence requirements. The angle tolerance will be decided based on number of Tx antenna. And if the test EIS beam is same EIRP beam direction, then we can say the UE guaranteed beam correspondence. Based on our analysis we made the following proposals.

Proposal 1. The requirements for beam correspondence should consider the difference between peak EIRP direction and peak EIS direction with locked/fixed beam direction of signals.

Proposal 2. The proposed test methodologies in section 2.1 are used for UE beam correspondence requirements. The allowed angle tolerance will be decide based on RAN4 consensus by measurement results Proposal 3. Define the beam correspondence requirement according to antenna configuration. However, 2×2 antenna configuration is baseline to specify the beam correspondence requirements.

Figure 11:
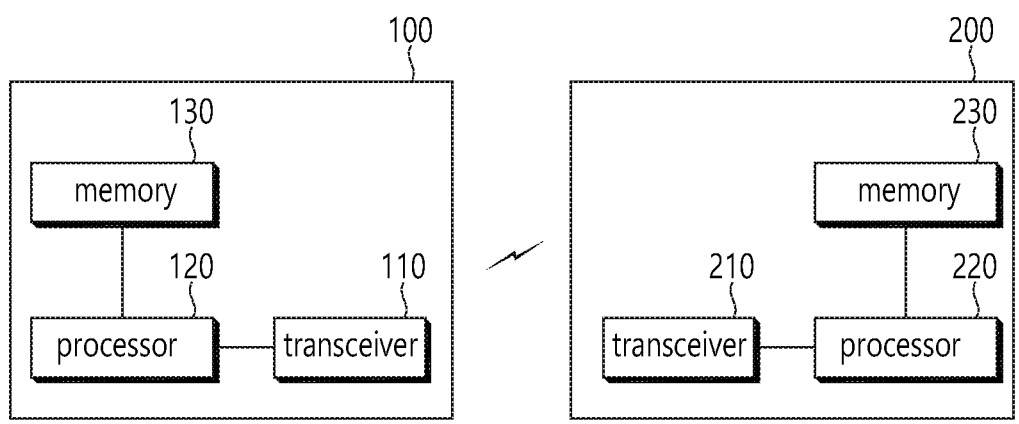
FIG. 11 is a block diagram illustrating a wireless device and a base station in which a disclosure of this specification is implemented.

FIG. 11 is a Block Diagram Illustrating a Wireless Device and a Base Station in which the Disclosure of the Present Invention is Implemented.

Referring to FIG. 11, a wireless device 100 and a base station 200 may implement the disclosure of this specification.

The illustrated wireless device 100 includes a processor 101, a memory 102, and a transceiver 103. Similarly, the illustrated base station 200 includes a processor 201, a memory 202, and a transceiver 203. The processors 101 and 201, the memories 102 and 202 and the transceivers 103 and 203 illustrated may be implemented as separate chips, or at least two blocks/functions may be implemented through a single chip.

The transceivers 103 and 203 include transmitters and receivers. When a specific operation is performed, only the operation of either the transmitter or the receiver may be performed, or both the transmitter and the receiver operations may be performed. The transceivers 103 and 203 may include one or more antennas that transmit and/or receive the radio signals. In addition, the transceivers 103 and 203 may include an amplifier for amplifying a reception signal and/or a transmission signal, and a band-pass filter for transmission on a specific frequency band.

The processors 101 and 201 may implement functions, processes, and/or methods proposed in this specification. The processors 101 and 201 may include encoders and decoders. For example, the processors 101 and 202 may perform operations according to the foregoing description. The processors 101 and 201 may include an application-specific integrated circuit (ASIC), another chipset, a logic circuit, a data processing device and/or a converter converting a baseband signal and the radio signal into each other.

The memories 102 and 202 may include a read-only memory (ROM), a random access memory (RAM), a flash memory, a memory card, a storage medium, and/or other storage devices.

Figure 12:
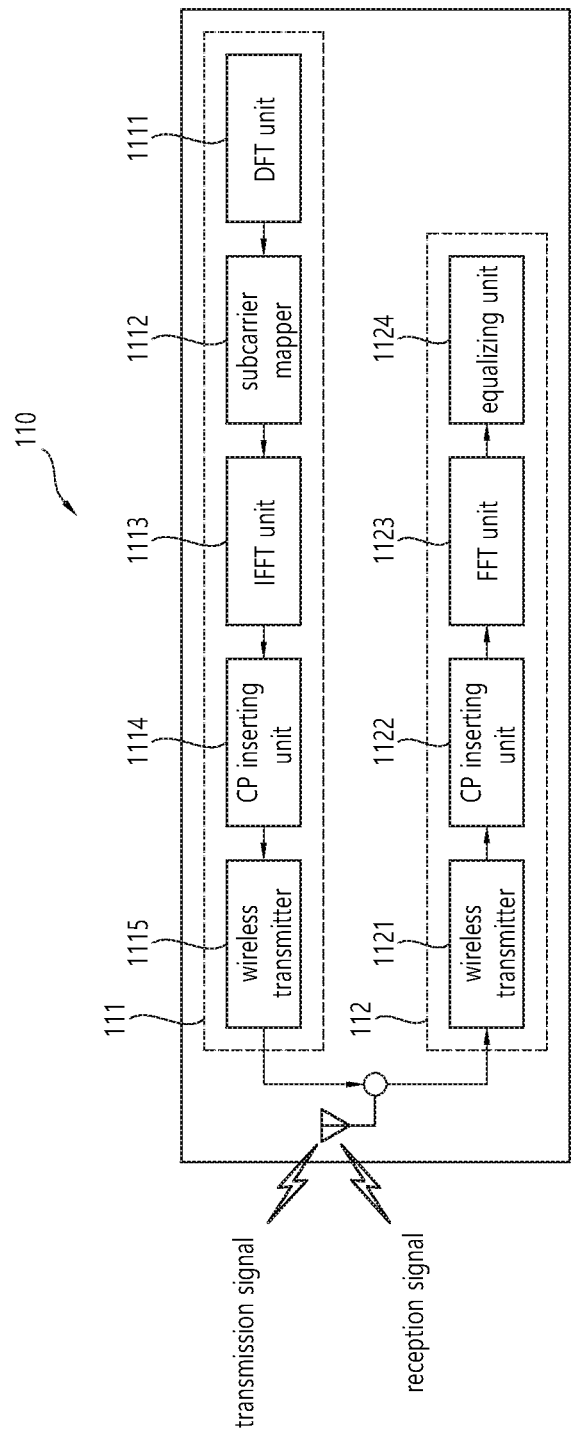
FIG. 12 is a detailed block diagram of a transceiver of the wireless device illustrated in FIG. 11.

FIG. 12 is a Detailed Block Diagram of the Transceiver of the Wireless Device Illustrated in FIG. 11.

Referring to FIG. 12, the transceiver 110 includes a transmitter 111 and a receiver 112. The transmitter 111 includes a discrete Fourier transform (DFT) unit 1111, a subcarrier mapper 1112, an IFFT unit 1113, a CP inserting unit 1114, and a wireless transmitter 1115. The transmitter 111 may further include a modulator. The transceiver 110 may further include a scramble unit, a modulation mapper (not shown), a layer mapper, and a layer permutator, which may be arranged before the DFT unit 1111. That is, in order to prevent an increase in peak-to-average power ratio (PAPR), the transmitter 111 first passes information through the DFT 1111 before mapping a signal to a subcarrier. A signal spread (or precoded in the same sense) by the DFT unit 1111 is subcarrier-mapped through the subcarrier mapper 1112 and then made to a signal on a time axis through the inverse fast Fourier transform (IFFT) unit 1113.

The DFT unit 1111 performs DFT on the input symbols to output complex-valued symbols. For example, when Ntx symbols are input (however, Ntx is a natural number), the DFT size is Ntx. The DFT unit 1111 may be referred to as a transform precoder. The subcarrier mapper 1112 maps the complex-valued symbols to subcarriers in the frequency domain. The complex-valued symbols may be mapped to resource elements corresponding to resource blocks allocated for data transmission. The subcarrier mapper 1112 may be referred to as a resource element mapper. The IFFT unit 1113 performs IFFT on the input symbol and outputs a baseband signal for data, which is a time domain signal. The CP inserting unit 1114 copies a part of the rear part of the base band signal for data and inserts the copied rear part to the front part of the base band signal for data. Inter-symbol interference (ISI) and inter-carrier interference (ICI) are prevented through CP insertion, and orthogonality may be maintained in a multi-path channel.

On the other hand, the receiver 112 includes a wireless receiving unit 1121, a CP removing unit 1122, an FFT unit 1123, and an equalizing unit 1124. The wireless receiving unit 1121, the CP removing unit 1122 and the FFT unit 1123 of the receiver 112 perform a reverse function of the wireless receiving unit 1115, the CP removing unit 1114 and the FFT unit 1113 of the transmitter 111. The receiver 112 may further include a demodulator.

What is claimed is:

1. A method of transmitting signal by a terminal, the method comprising: selecting an effective isotropic sensitivity (EIS) beam direction of at least one antenna of the terminal; based on the selected EIS, determining an equivalent isotropically radiated power (EIRP) of the at least one antenna based on a power loss tolerance of the signal and an angle tolerance of the at least one antenna; and transmitting the signal based on the determined ERR of the at least one antenna, wherein the power loss tolerance of the signal is determined at maximum of 2 dB.

2. The method of claim 1, wherein the angle tolerance of the at least one antenna is determined at maximum of ±18 degrees in a horizontal direction and at maximum of X18 degrees in a vertical direction.

3. The method of claim 1, wherein the angle tolerance of the at least one antenna is determined based on the power loss tolerance of the signal.

4. The method of claim 3, wherein the angle tolerance of the at least one antenna is further determined based on a number of antennas of the at least one antenna.

5. The method of claim 4, wherein the at least one antenna includes two horizontal antennas and two vertical antennas.

6. A communication device comprising: a transceiver configured to transmit a signal; at least one antenna; and a processor configured to control the transceiver, wherein the processor is further configured to: select an effective isotropic sensitivity (EIS) beam direction of at least one antenna, based on the selected EIS, determine an equivalent isotropically radiated power (EIRP) of the at least one antenna based on a power loss tolerance of the signal and an angle tolerance of the at least one antenna, and control the transceiver to transmit the signal based on the determined ERR of the at least one antenna, wherein the power loss tolerance of the signal is determined at maximum of 2 dB.

7. The communication device of claim 6, wherein the angle tolerance of the at least one antenna is determined at maximum of ±18 degrees in a horizontal direction and at maximum of ±18 degrees in a vertical direction.

8. The communication device of claim 6, wherein the angle tolerance of the at least one antenna is determined based on the power loss tolerance of the signal.

9. The communication device of claim 8, wherein the angle of at least one antenna is further determined based on a number of antennas of the at least one antenna.

10. The communication device of claim 9, wherein the at least one antenna includes two horizontal antennas and two vertical antennas.

* * * * *